INVENTOR
FRANK J. STEINHARDT

Feb. 6, 1973   F. J. STEINHARDT   3,714,740
GEAR DEBURRING DEVICE

Filed Aug. 24, 1970   2 Sheets-Sheet 2

INVENTOR
FRANK J. STEINHARDT

United States Patent Office 3,714,740
Patented Feb. 6, 1973

3,714,740
GEAR DEBURRING DEVICE
Frank J. Steinhardt, 2208 E. 9th St. S.,
Salt Lake City, Utah 84108
Filed Aug. 24, 1970, Ser. No. 66,373
Int. Cl. B24b 9/00
U.S. Cl. 51—33
6 Claims

ABSTRACT OF THE DISCLOSURE

A device for simultaneously deburring both faces of a centerless gear. The deburring device includes a centerless gear holding means having a plurality of extendable arms radially mounted to a rotatable table. Each of the arms has a resilient member at its outer end which when extended radially by hydraulic means, contacts and exerts a force on the inner walls of the centerless gear. The amount of hydraulic force exerted is sufficient to hold the gear suspended in a "floating" relationship above a support surface. A pair of abrasive spindles are carried on the gear holding means for gear deburring.

BACKGROUND OF INVENTION

This invention relates to a device for contouring gear surfaces and, particularly, to a device for chamfering or deburring both faces of a centerless gear simultaneously.

DESCRIPTION OF PRIOR ART

Teeth on external or internal gears are generally produced by hobbing, shaping or milling. During gear production sharp burrs or edges are generally formed along both faces of the gear. To avoid contamination of drive mechanisms by metal particles which would be separated from the tooth edge during gear action, the burrs are removed by either hand or machine filing. Hand filing is a time-consuming process and is used only where machine filing would be undesirable. Machine filing can be accomplished by a device having an abrasive spindle mounted adjacent to a slowly rotating horizontal table. As the gear carried by the rotating table passes a predetermined point, the abrasive spindle contacts and follows the contour of the exposed or upper face of the gear removing any burrs encountered. When the deburring action on the exposed or upper face has been completed, the gear is turned over and the deburring action repeated for the other side. Other devices useful on smaller gears follow essentially the same basic design described above but because of their smaller size are more adaptable to deburring and gear handling operations which can be automated easily.

Occasionally a device is proposed which is capable of exposing both faces of a gear for deburring. However, these devices are limited in use to either a single gear size or to a very narrow range of small sized gears and in most all cases are not readily adaptable for use on large internal gears.

OBJECTS OF INVENTION

It is, therefore, an object of this invention to provide a device capable of holding gears in a suspended or "floating" position and, thereby, expose both faces of the gear for simultaneous deburring.

Another object of this invention is to provide a device capable of contouring or deburring large centerless gears with a minimum of gear handling.

Still another object of this invention is to provide a deburring device which can be adjusted to handle a broad range of gear sizes and particularly internal gears having a diameter in excess of five feet.

Still a further object of this invention is to provide a device for use in deburring which is simple in construction, dependable in operation, and capable of being operated by persons having a minimum of specialized training.

Other objects will be apparent from the description and drawings which follow.

SUMMARY OF THE INVENTION

The above and other objects of this invention are attained with a specially designed deburring device having a support member for carrying a gear abrading means (e.g., rotatable grinding spindle) and a gear holder or a gear holding means which includes a rotatable table, a plurality of extendable arms mounted radially to the surface of the table, resilient members attached to the outer ends of said arms, and means for extending said arms outwardly from said table.

With this device, both sides of a centerless gear may be deburred simultaneously. This is achieved by extending the resilient tipped arms of the gear holding means outwardly until the resilient members come in forceful contact against the inner walls of the centerless gear. The amount of force exerted by the resilient members against the inner walls is such that when the gear holder is lifted or raised above the support surface the gear is likewise raised and thereby in effect becomes suspended or floated above the support surface.

DESCRIPTION OF PREFERRED EMBODIMENT

Figure 1:
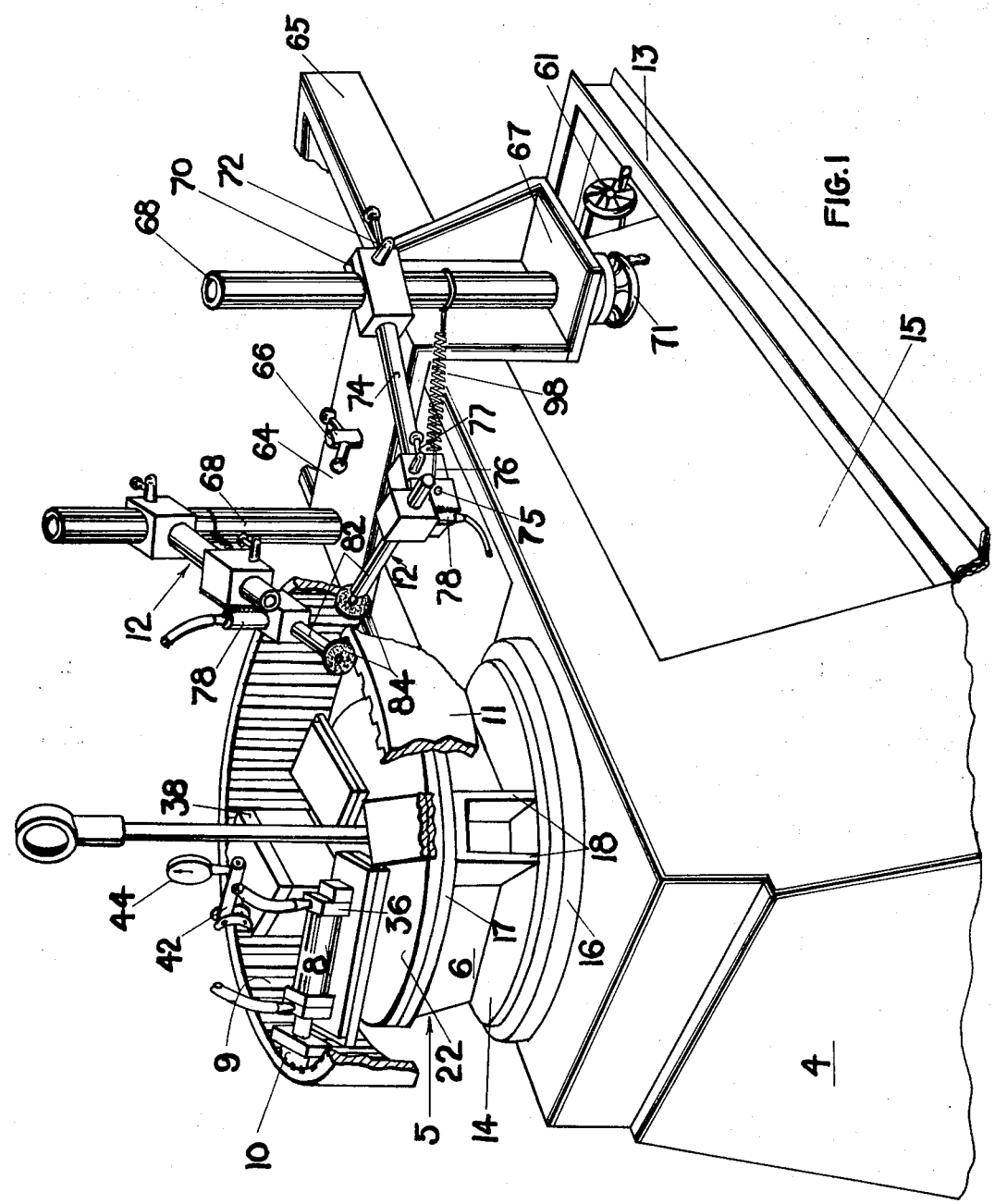
FIG. 1 is a perspective view showing generally a deburring device of this invention with parts broken away for clarity.
Figure 2:
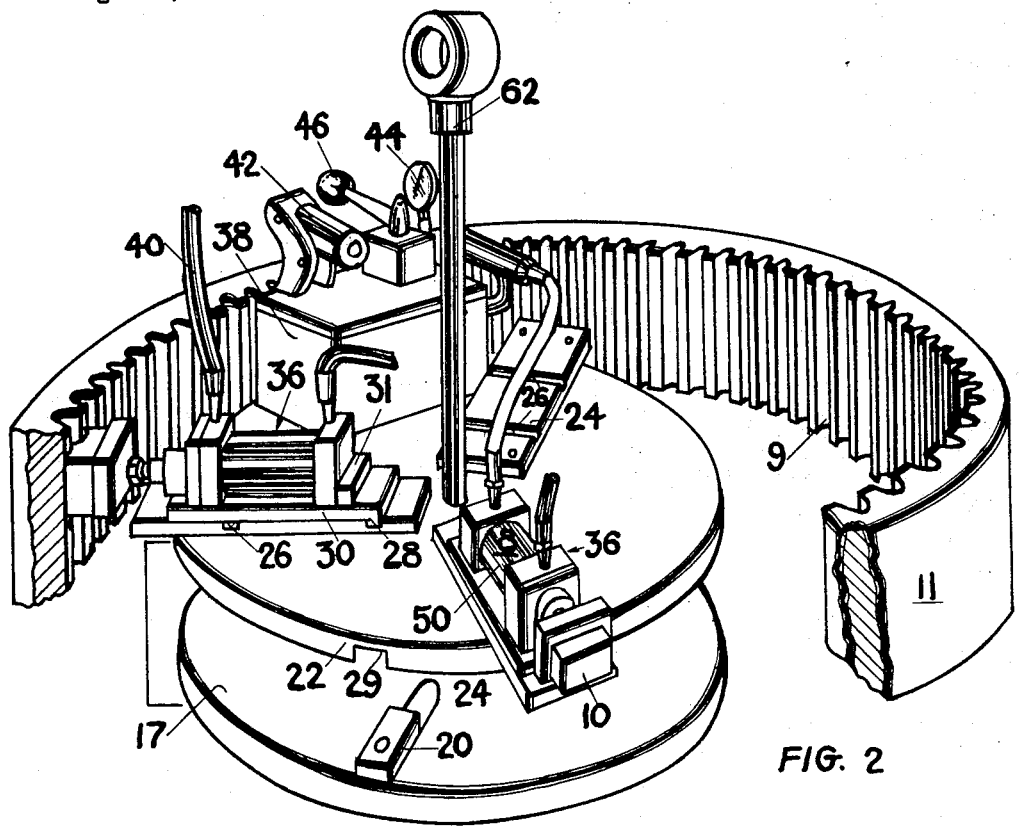
FIG. 2 is a perspective view showing a gear holding device used in the deburring device shown in FIG. 1 with parts broken away for clarity.

Referring to the various views, particularly to FIGS. 1 and 2, the device of this invention is shown generally to include a generally rectangular machine housing and support member 4 having upward and inward sloping walls for carrying a gear holder or gear holding means shown generally by numeral 5. The gear holder includes an adapter 6 rotatably to the top of the support member, a plurality of extendable arms 8 mounted radially to the top of the adapter, a plurality of resilient members 10 attached to the outer ends of each of the extendable arms for forcibly engaging the inner walls 9 (teeth) of a centerless gear 11 when extended outwardly, and a pair of gear abrading means 12 carried by the support member for following and contouring the teeth of a centerless gear.

More specifically, the support member 4 shown in FIG. 1 can also serve as a machine housing for a variable drive motor, speed reducers, shafts, bearings, etc. (none shown), used for rotating the adapter 6 at a preselected speed. In the particular embodiment shown in FIG. 1, the enclosure and support member 4 is fabricated from a steel frame 13 having sheet metal siding 15.

The adapter 6 comprises a circular mounting plate 14 (FIG. 1) which is journaled for rotation to a mating plate 16 mounted to a shaft (not shown) extending upwardly from the support member. An upper circular plate 17 is connected to the lower plate through gussets 18 which are welded to both plates. The purpose of the adapter is to provide the gear holder with a means for elevating the extendable arms above the support member and thereby prevent chafing of internal gears against the machine housing during deburring. In addition the adapter can be easily removed and a flat locating plate can be fastened in its place if, for example, spur or solid gears, rather than an internal gear is to be deburred, thus adding to the device's versatility.

The gear holding means comprises a circular or base plate 22 keyed to upper plate 17 through key slot 29 and keys 20 (see FIG. 2). When the plates are concentrically positioned and keyed, base plate 22 is accurately and centrally positioned on the device and will respond immediately, with no slippage, to whatever rotational movement is generated by plate 17.

Mounted to and extending radially from the center of base plate 22 and outwardly beyond its peripheral edge are three equidistantly spaced (120° from each other) and substantially identical support plates 24. The support plates also have two or more spaced-apart slots 26 running laterally across its surface. These slots are designed to engage a laterally positioned key 28 mounted to the bottom of each overlying cylinder mounting plate 30 at or near its rear edge. The choice of slot will vary the position of the extendable arms 8 from the peripheral edge of plate 22 thus varying the limits to which the arms can be extended. This permits a broad range of gears to be deburred.

Preferably the extendable arms 8 comprise conventional spring-return type hydraulic cylinders 36 mounted to cylinder mounting plates 30 against thrust bar 31. The cylinders are connected to an oil reservoir 38 through oil lines 40. The reservoir contains a pump (not shown) having a pump bracket and handle 42 for pumping fluid into each of the cylinders. A pressure gauge 44 and a release valve 46 for releasing the oil pressure and permitting the cylinders to retract are also provided.

Figure 3:
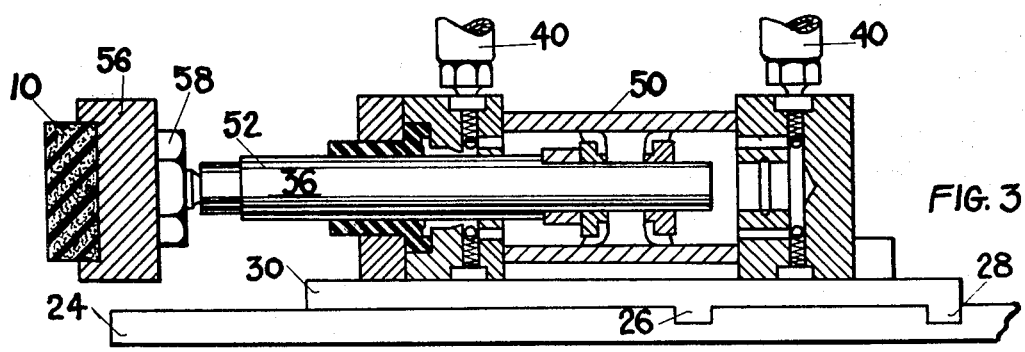
FIG. 3 is a side view of one of the hydraulic cylinders shown in FIG. 1 with a major portion of the cylinder being cross sectioned.

Referring now to FIG. 3, it can be seen that the hydraulic cylinders are of conventional design, and include a cylinder 50 and piston or rod 52. Threaded nose adapters 56 are connected to the pistons 52 and held in locked position by jam nuts 58. Mounted to each of the nose adapters are resilient members 10, such as polyurethane pads or other elastomeric type materials such as rubbers, plastics, resins and the like.

Mounted perpendicular to the center of the base plate 22 is a central lifting bolt and eye 62 which permits the gear holder to be lifted and moved where desired. For example, when a centerless gear is to be contoured, the gear holder is carried by a crane or hoist to wherever the centerless gear is located and lowered within its center. Pump handle 42 is raised and lowered, forcing oil into cylinders 50, causing rods 52 and the resilient pad 10 to extend outward against the teeth 9 of the internal gear 11. Pumping is continued until the pressure exerted by the cylinders is sufficient to hold or suspend the gear in a "floating" position without slipping. The gear supporting system and internal gear are then lifted and placed on upper plate 17 and keyed into position. The variable motor is started and maintained at a selected speed by control 61 causing the gear to rotate slowly. Revolving abrading means are then positioned against both faces of the gear to follow the contours of the gear and deburr both faces of the gear simultaneously.

The abrading means are carried on a bridge 64 slidably mounted to the side frame 65 of support member 4 and locked in position by speed nut 66. Mounted to the bridge are brackets 67 to which a half threaded vertical post 68 is mounted. The post can be raised or lowered by means of a handwheel 71. Since both spindles are essentially alike, only one will be described in detail.

A slide block 70 overrides the non-threaded portion of post 68 for vertical and pivotal movement. The slide block can be locked into position anywhere along post 68 by locknut 72. Extending horizontally from slide block 70 is a second post 74 fitted with a second slide block 76 (similar to slide block 70) having a locknut 77.

Figure 4:
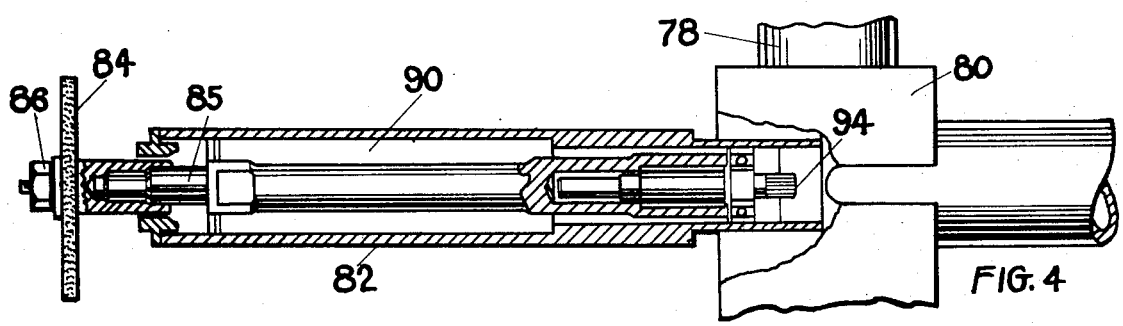
FIG. 4 is a side cutaway view of one of the operating spindles shown in FIG. 1.

Mounted to a slide block 76 is a nippled air connector 78 which, in turn, is mounted to and opens into a box housing 80. Passing through housing 80 is an air spindle 83 having a grinding or abrading wheel 84 mounted to a rotatable shaft 85 by locknut 86 (see FIG. 4). The air spindle 82 is of conventional design and, as can be seen in FIG. 4, comprises generally a cylinder 90, having a rotatable shaft driven by air vanes 94. Air is introduced through air connector 78 into housing 80 causing air vanes 94, shaft 85, and finally abrading wheels 84 to rotate.

Grinding wheel 84 follows the contours of gear 11 with the aid of a tension spring 96 which continually urges the grinding wheel against the teeth of the gear. As the gear is slowly rotated, the grinding wheel 84 moves in and out of the spaces between the teeth.

Although the inventive concept described herein refers to specific features, such specificity is intended for example only and is not to be construed as limiting this invention as it is intended that the invention be limited only by the claims appended hereto. It is also understood that any suitable changes, modifications and variations may be made without departing from the spirit and scope of the invention.

What is claimed is:

1. A device for deburring centerless gears, comprising a support member, a base member rotatably mounted to the top of said support member, a plurality of extendable arms radially mounted to the top of said base member, resilient members attached to the outer ends of each of said arms, means for extending said arms outwardly beyond the peripheral edge of said base member so that the resilient members will come in contact with the inner wall of said centerless gear, means for rotating said base member, and gear abrading means mounted to said support member and extending outwardly therefrom for following and contouring both faces of said centerless gear simultaneously as said centerless gear is rotated by said rotating base member.

2. The device of claim 1, wherein the base member is keyed to said support member.

3. The device of claim 1, wherein said extendable arms are hydraulically actuated rods keyed to said base member.

4. The device of claim 1, including a means mounted to said base member to allow said base member to be lifted and moved to and from said support member.

5. The device of claim 4, wherein the abrading means comprises air-actuated spindles having rotating grinding wheels attached at one end for contouring the teeth of the centerless gear.

6. The device of claim 1, wherein said extendable arms are hydraulically actuated rods and the resilient members comprise elastomeric pads attached to the outer ends of said rods.

References Cited

UNITED STATES PATENTS

| 2,660,440 | 11/1953 | Kurtz | 279—4 |
| 3,366,343 | 1/1968 | Wessamer | 269—48.1 X |
| 2,321,146 | 6/1943 | Jones | 279—24 X |
| 2,158,423 | 5/1939 | Huff | 51—DIG. 1 |
| 1,304,278 | 5/1919 | Dessez | 51—134.5 F |
| 2,316,490 | 4/1943 | Semar | 51—DIG. 1 |
| 903,106 | 11/1908 | Phelps | 51—DIG. 1 |

HAROLD D. WHITEHEAD, Primary Examiner

U.S. Cl. X.R.

51—227